(12) United States Patent
Sunkaranam et al.

(10) Patent No.: US 10,826,917 B2
(45) Date of Patent: Nov. 3, 2020

(54) MALICIOUS DATA SCAN SERVICE

(71) Applicant: ServiceNow, Inc., Santa Clara, CA (US)

(72) Inventors: Ravindra Sunkaranam, Hyderabad (IN); Aditya Ramamurthy, Hyderabad (IN); Chandra Sekhar Mudili, Rajam (IN); Sugandh Rakha, Hyderabad (IN); Jatin Agrawal, Hyderabad (IN)

(73) Assignee: ServiceNow, Inc., Santa Clara, CA (US)

( * ) Notice: Subject to any disclaimer, the term of this patent is extended or adjusted under 35 U.S.C. 154(b) by 246 days.

(21) Appl. No.: 15/969,580

(22) Filed: May 2, 2018

(65) Prior Publication Data

US 2019/0342305 A1 Nov. 7, 2019

(51) Int. Cl.
*H04L 9/00* (2006.01)
*H04L 29/06* (2006.01)

(52) U.S. Cl.
CPC ...... *H04L 63/1416* (2013.01); *H04L 63/0209* (2013.01); *H04L 63/145* (2013.01); *H04L 63/20* (2013.01); *H04L 63/02* (2013.01)

(58) Field of Classification Search
CPC .................................................. H04L 63/1416
USPC .......................................................... 726/24
See application file for complete search history.

(56) References Cited

U.S. PATENT DOCUMENTS

| | | | |
|---|---|---|---|
| 6,321,229 B1 | 11/2001 | Goldman | |
| 6,816,898 B1 | 11/2004 | Scarpelli | |
| 7,020,706 B2 | 3/2006 | Cates | |
| 7,159,036 B2 * | 1/2007 | Hinchliffe | H04L 63/145 709/223 |
| 7,716,353 B2 | 5/2010 | Golovinsky | |
| 7,769,718 B2 | 8/2010 | Murley | |
| 7,925,981 B2 | 4/2011 | Pourheidari | |
| 8,151,261 B2 | 4/2012 | Sirota | |
| 8,402,127 B2 | 3/2013 | Solin | |
| 8,612,408 B2 | 12/2013 | Trinon | |
| 8,646,093 B2 | 2/2014 | Myers | |
| 8,756,683 B2 | 6/2014 | Manion et al. | |
| 8,832,652 B2 | 9/2014 | Mueller | |
| 9,065,783 B2 | 6/2015 | Ding | |
| 9,098,322 B2 | 8/2015 | Apte | |
| 9,122,552 B2 | 9/2015 | Whitney | |
| 9,237,166 B2 * | 1/2016 | Bennett | G06F 16/951 |
| 9,317,327 B2 | 4/2016 | Apte | |
| 9,350,755 B1 | 5/2016 | Glick et al. | |
| 9,363,252 B2 | 6/2016 | Mueller | |
| 9,535,737 B2 | 1/2017 | Joy | |

(Continued)

*Primary Examiner* — Christopher J Brown

(74) *Attorney, Agent, or Firm* — Fletcher Yoder PC

(57) ABSTRACT

A communication network may scan data to identify and prevent the spread of malicious data, such as viruses, worms, trojans, malware, and the like, transmitted through the communication network. As scanning content for malicious data within an application program or an application node hosted on the communication network may limit the performance of the application program, a server in a load balanced datacenter environment may host a malicious data scan as a service. Accordingly, the malicious data scan service may scale effectively to accommodate an increasing number of application nodes in the network, and by retrieving updated definitions of malicious data at suitable times, the server may identify malicious data with increasing reliability.

19 Claims, 11 Drawing Sheets

(56) References Cited

U.S. PATENT DOCUMENTS

| | | |
|---|---|---|
| 9,645,833 B2 | 5/2017 | Mueller |
| 9,654,833 B2 | 5/2017 | Mueller |
| 9,766,935 B2 | 9/2017 | Kelkar |
| 9,781,142 B2 * | 10/2017 | Seinfeld .................. G06F 21/56 |
| 9,805,322 B2 | 10/2017 | Kelkar |
| 9,819,729 B2 | 11/2017 | Moon |
| 10,091,214 B2 * | 10/2018 | Godlewski .............. H04L 63/14 |
| 2015/0172304 A1 * | 6/2015 | Kleczynski ......... H04L 63/1416 |
| | | 726/23 |
| 2015/0188949 A1 * | 7/2015 | Mahaffey ................ H04L 63/20 |
| | | 726/1 |
| 2016/0188878 A1 | 6/2016 | Kulkarni et al. |
| 2019/0089740 A1 * | 3/2019 | Hastings ................ H04L 63/20 |

\* cited by examiner

MALICIOUS DATA SCAN SERVICE

BACKGROUND

The present disclosure relates generally to scanning content, such as a digital file, for malicious data. More particularly, the present disclosure relates to hosting a malicious data scanning service on a centralized server.

This section is intended to introduce the reader to various aspects of art that may be related to aspects of the present disclosure, which are described and/or claimed below. This discussion is believed to be helpful in providing the reader with background information to facilitate a better understanding aspects of the present disclosure. Accordingly, it should be understood that these statements are to be read in this light, and not as admissions of prior art.

Communication networks are a tool for sharing information and processing capacity among many computers or other network-capable devices. These networks, however, may receive and/or spread malicious data, such as viruses, malware, worms, and/or the like, between devices on the network if data transmitted over the network becomes infected with malicious data. Further, as the number of users and/or devices in the communication network increases, the potential for malicious data may increase. However, scanning data for malicious data may involve significant time and resources, limiting the efficiency of the communication network, and as the size of the network grows (e.g., the number of unauthenticated users increases), the time and resources involved with scanning data to protect the communication network from malicious data may increase.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The disclosed techniques include hosting, using one or more security severs in a load balanced datacenter environment, a service to scan for malicious data (e.g., viruses, malware, worms, and/or the like) within a communication network. In the communication network, an application program hosted within a platform may receive a request from a client computing device to upload and/or download content (e.g., a digital file) to the application program. As such content may contain malicious data, to identify and to limit the spread of the malicious data throughout the communication network, the content may be scanned for malicious data. However, scanning content within the application program may consume the limited resources of the application, resulting in decreased application program performance. Accordingly, by offloading the scan for malicious data to run as a service of the one or more security servers, the application program may communicate with the client computing device more efficiently. Further, by hosting the one or more security servers in a load balanced datacenter, the number of security servers may efficiently be scaled based on load to more effectively handle a changing demand for malicious data scans within the communication network Various refinements of the features noted above may exist in relation to aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
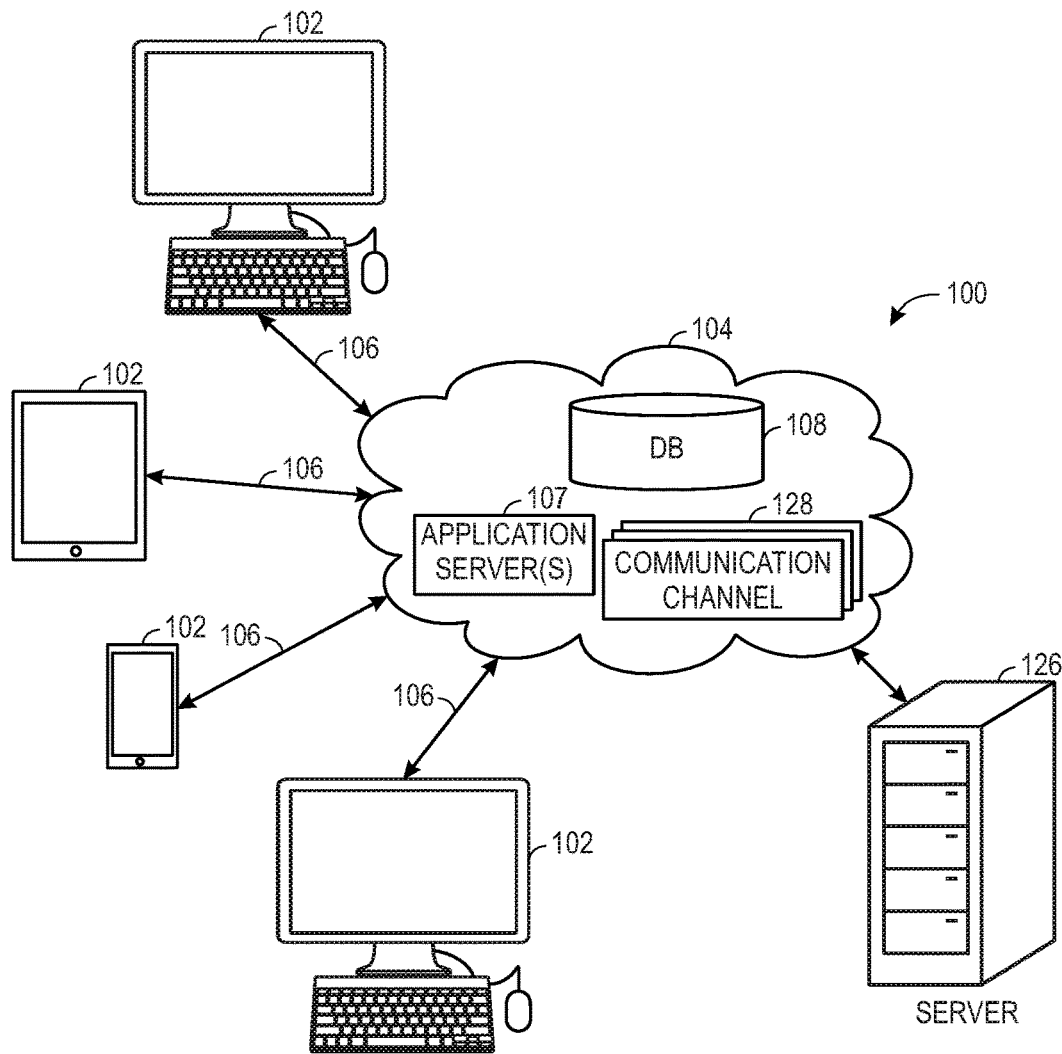
FIG. 1 is a block diagram of a distributed computing system utilizing a platform and a database (DB), in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

A communication network may be utilized to share information with computing devices directly or indirectly connected to the network. For example, an application program (e.g., Community application hosting forums or discussion groups, a human resources application for accepting and processing applications and resumes, an accounting application for processing invoices and bills, and so forth) hosted by an application server in a platform maintained on the communication network may allow the computing devices to upload content (e.g., a file) to and/or download content from a database within the platform. As such, a first computing device may access (e.g., download) content uploaded to the database from a second computing device. However, as the number of users, potentially including unauthorized or unsecure users, uploading and/or downloading content via the computing devices increases, the number of potential sources for transmitting malicious data, such as viruses, worms, trojans, malware, and the like, between components (e.g., computing devices) in the communication network may increase. Accordingly, the communication network may scan an increased amount of data (e.g., uploaded content and/or downloaded content) for malicious data to identify and prevent the spread of such malicious data transmitted through the communication network. As scanning content for malicious data within the application program or an application node running the application program (e.g., an instance of the application program) may limit the performance of the application program by consuming limited resources, in some embodiments, a security server (e.g., a ServiceNow antivirus program (SNAP) server) in a load balanced datacenter environment may host the malicious data scan as a service. Accordingly, the application program or node may utilize less time and/or resources to communicate with a computing device, as the malicious data scan may be offloaded to the security server. Further, because the security server(s) may be implemented in a load balanced datacenter, the number of security servers may be scaled based on load to more effectively handle an increasing (or decreasing) number of computing devices communicating and/or application nodes running in the network. Further, by retrieving updated definitions of malicious data (e.g., malware signatures) at suitable times, the security server may identify malicious data with increasing reliability.

With the preceding in mind, FIG. 1 is a block diagram of a system 100 that utilizes distributed computing and that may be used in conjunction with the approaches discussed herein. As illustrated, one or more client devices 102 communicate with a platform (e.g., a cloud service) 104 over a communication channel 106. Each client device 102 may include any suitable computing system. For instance, the client device 102 may include one or more computing devices, such as a mobile phone, a tablet computer, a laptop computer, a notebook computer, a desktop computer, or any other suitable computing device or combination of computing devices. Each client device 102 may include client or access application programs running on the computing devices. Each client device 102 can be implemented using a single physical unit or a combination of physical units (e.g., distributed computing) running one or more client application programs. Furthermore, in some embodiments, a single physical unit (e.g., server) may run multiple client application programs simultaneously.

The platform (e.g., cloud service) 104 may include any suitable number of computing devices (e.g., computers) in one or more locations that are connected together using one or more networks. For instance, the platform 104 may include various computers acting as servers in datacenters at one or more geographic locations where the computers are connected together using network and/or Internet connections. The communication channel 106 may include any suitable communication mechanism for electronic communication between each client device 102 and the platform 104. The communication channel 106 may incorporate local area networks (LANs), wide area networks (WANs), virtual private networks (VPNs), cellular networks (e.g., long term evolution networks), and/or other network types for transferring data between the client device 102 and the platform 104. For example, the communication channel 106 may include an Internet connection when the client device 102 is not on a local network common with the cloud service 104. Additionally or alternatively, the communication channel 106 may include network connection sections when the client and the cloud service 104 are on different networks or entirely using network connections when the client device 102 and the cloud service 104 share a common network. Although only four clients 102 are shown connected to the platform 104 in the depicted example, it should be noted that platform 104 may connect to any number of clients 102 (e.g., tens, hundreds, or thousands of clients 102).

Through the platform 104, the client device 102 may connect to various devices with various functionality, such as gateways, routers, load balancers, databases, application servers running application programs on one or more nodes, or other devices that may be accessed via the platform 104. For example, the client device 102 may connect to an application server 107 and/or a database (DB) 108 via the platform 104. The application server 107 may include any computing system, such as a desktop computer, laptop computer, server computer, and/or any other computing device capable of providing functionality from an application program to the client device 102. The application server 107 may include one or more application nodes running application programs whose functionality is provided to the client via the platform 104. The application nodes may be implemented using processing threads, virtual machine instantiations, or other computing features of the application server 107. Moreover, the application nodes may store, evaluate, or retrieve data from a database and/or a database server (e.g., the DB 108). For example, the DB 108 may store tables of information (e.g., content, content types, user permissions, user profile data, user subscription data, notification preferences, etc.) relevant to the application supported by an application node.

Additional to or in place of the DB 108, the platform 104 may include one or more other database servers. The database servers are configured to store, manage, or otherwise provide data for delivering services to the client device 102 over the communication channel 106. The database server includes one or more databases (e.g., DB 108) that are accessible by the application server 107, the client device 102, and/or other devices external to the databases. The databases may be implemented and/or managed using any suitable implementations, such as a relational database management system (RDBMS), an object database, an extensible markup language (XML) database, a configuration management database (DB), a management information base (MIB), one or more flat files, and/or or other suitable non-transient storage structures. In some embodiments, more than a single database server may be utilized. Furthermore, in some embodiments, the platform 104 may have access to one or more databases external to the platform 104 entirely.

Access to the platform 104 is enabled via a server 126 via a communication channel 128. The server 126 may include an application program (e.g., Java application) that runs as a service (e.g., Windows service or UNIX daemon) that facilitates communication and movement of data between the platform 104 and external applications, data sources, and/or services. The server 126 may be implemented using a computing device (e.g., server or computer) on the network 112 that communicates with the platform 104.

The communication channel 128 may be a database table that is typically queried, updated, and inserted into by other systems. In such an implementation, each record in the communication channel 128 is a message from an instance in the platform 104 to a system (e.g., server 126) external to the platform 104 that connects to the platform 104 or a specific instance running in the platform 104 or a message to the instance from the external system. The fields of a communication channel 128 record include various data about the external system or the message in the record.

The application servers 107 may store content accessible by one or more users via one of the clients 102. For example, the application server 107 may facilitate user interaction to upload content to and/or download content from an application, such as a Community application. As a result, users may share content such as files, attachments, data, and the like via the application servers 107.

As discussed herein, users may be allowed to upload content to and/or download content from an application. In such circumstances, the content transmitted via the application servers 107 has the potential to contain malicious data. Accordingly, the content transmitted via the application servers 107 may be scanned for malicious data before the content is made available to additional clients 102 and/or components (e.g., application server 107, database 108, server 126, and the like) of the system 100. Further, to improve the performance of the application server 107, which may host an application node running the respective application for each client device 102 interacting with the application, a security server may host the malicious data scan as a service, as will be described in further detail below. Accordingly, the time and resources involved with scanning data in the system 100 for malicious data may be reduced or offloaded so as to reduce impact on application services.

Figure 2:
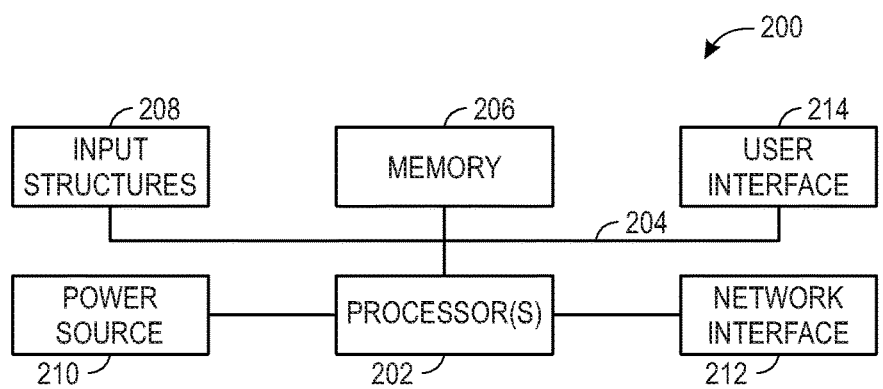
FIG. 2 is a block diagram of a computing device utilized in the distributed computing system of FIG. 1, in accordance with an embodiment.

FIG. 2 generally illustrates a block diagram of an internal configuration of a computing device 200, such as a computing device suitable for utilizing or providing access to an application or database or for performing scans for malicious data, as discussed herein. With respect to FIGS. 1 and 2, the computing device 200 may be an embodiment of the client device 102, the application server 107, a database server (e.g., DB 108), other servers in the platform 104 (e.g., server hosting the communication channel 128) or a security server as discussed herein, and/or a device running the server 126. As previously noted, these devices may include a computing system that includes multiple computing devices and/or a single computing device, such as a mobile phone, a tablet computer, a laptop computer, a notebook computer, a desktop computer, a server computer, and/or other suitable computing devices.

As illustrated, the computing device 200 may include various hardware components. For example, the device includes one or more processors 202, one or more buses 204, memory 206, input structures 208, a power source 210, a network interface 212, a user interface 214, and/or other computer components useful in performing the functions described herein.

The one or more processors 202 may include a processor capable of performing instructions stored in the memory 206. For example, the one or more processors may include microprocessors, system on a chips (SoCs), or any other circuitry capable of performing functions by executing instructions, such as instructions stored in the memory 206. Additionally or alternatively, the one or more processors 202 may include application-specific integrated circuits (ASICs), field-programmable gate arrays (FPGAs), and/or other devices that may perform the functions discussed herein without calling instructions from the memory 206. Moreover, the functions of the one or more processors 202 may be distributed across multiple processors in a single physical device or in multiple processors in more than one physical device. The one or more processors 202 may also include specialized processors, such as a graphics processing unit (GPU).

The one or more buses 204 includes suitable electrical channels to provide data and/or power between the various components of the computing device. For example, the one or more buses 204 may include a power bus from the power source 210 to the various components of the computing device. Additionally, in some embodiments, the one or more buses 204 may include a dedicated bus among the one or more processors 202 and/or the memory 206.

The memory 206 may include any tangible, non-transitory, and computer-readable storage media. For example, the memory 206 may include volatile memory, non-volatile memory, or any combination thereof. For instance, the memory 206 may include read-only memory (ROM), randomly accessible memory (RAM), disk drives, solid state drives, external flash memory, or any combination thereof. Although shown as a single block in FIG. 2, the memory 206 can be implemented using multiple physical units in one or more physical locations. The one or more processor 202 accesses data in the memory 206 via the one or more buses 204.

The input structures 208 provide structures to input data and/or commands to the one or more processor 202. For example, the input structures 208 may include a positional input device, such as a mouse, touchpad, touchscreen, and/or the like. The input structures 208 may also include a manual input, such as a keyboard and the like. These input structures 208 may be used to input data and/or commands to the one or more processors 202 via the one or more buses 204. The input structures 208 may alternative or additionally include other input devices.

The power source 210 can be any suitable source for power of the various components of the computing device 200. For example, the power source 210 may include line power and/or a battery source to provide power to the various components of the computing device 200 via the one or more buses 204.

The network interface 212 is also coupled to the processor 202 via the one or more buses 204. The network interface 212 includes one or more transceivers capable of communicating with other devices over one or more networks (e.g., the communication channel 106). The network interface may provide a wired network interface, such as Ethernet, or a wireless network interface, such an 802.11, Bluetooth, cellular (e.g., LTE), or other wireless connections. Moreover, the computing device 200 may communicate with other devices via the network interface 212 using one or more network protocols, such as Transmission Control Protocol/Internet Protocol (TCP/IP), power line communication (PLC), Wi-Fi, infrared, and/or other suitable protocols.

A user interface 214 may include a display that is configured to display graphics transferred to it from the one or more processors 202. In addition and/or alternative to the display, the user interface 214 may include other devices for interfacing with a user.

As discussed herein, an application program and/or application node in the platform 104 may host an application that allows a user to upload content to and/or download content from, for example, the database 108. In some embodiments, content suitable to be uploaded and/or downloaded via the application may include any suitable file format, such as a text file (e.g., a file with the extension .txt), a document (e.g., a file with the extension .doc, .docx, or .pdf) an image (e.g., a file with the extension .jpeg, .png, or the like), a media file (e.g., a file with the extension .mp4), and/or the like. Accordingly, a user may use the computing device 200 to upload and/or download such content to and/or from the application.

Further, in some embodiments, before a user may transmit content to and/or receive content from (e.g., upload and/or receive, respectively) the application, the identity and/or credentials associated with the user may be determined. Additionally or in the alternative, the user may request authorization to access and interact with the application, which may involve an approval process. As such, access to the application may be limited to a set of suitable users, and threatening users, such as programs designed to disperse malicious data, may be blocked from accessing the application. In some embodiments, however, the user may upload and/or download content from the application without any authorization and/or validation of credentials. As such, the content flowing into and out of the application may originate from a wider variety of sources (e.g., users). Accordingly, to protect each of the users, the application, and any other systems that may communicate with the application, the content may be scanned to search for malicious data (e.g., malware, virus, trojan, worm, and the like).

Figure 3:
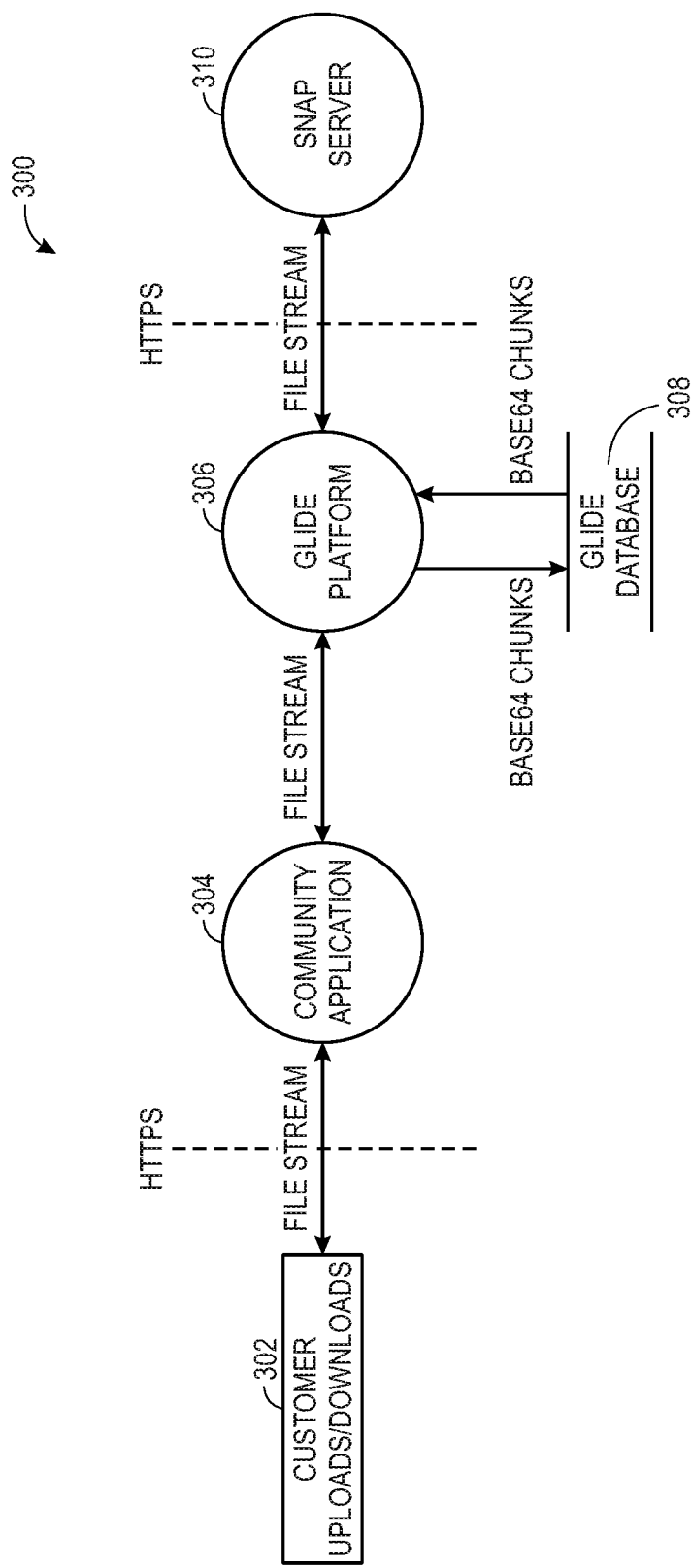
FIG. 3 is a dataflow diagram of content uploads and downloads in the distributed computing system of FIG. 1, in accordance with an embodiment.

Turning now to FIG. 3 and with reference to FIG. 1, an embodiment of a dataflow 300 used to exchange content between an application and a user is illustrated. In such embodiments, the user may interact with a client device 102 via a computing device 200, for example, to access a client application. As shown in the illustrated embodiment, the client application may include an interface allowing the user to upload to and/or download content (shown at block 302) from a certain location, such as the platform 104. The client application may, in turn, interact with an application server 107, which may host an application 304 (e.g., the depicted Community application). More specifically, in some embodiments, the client application may interact with an application node of the application 304 hosted by the application server 107. Further, as described above, a communication channel 106 may facilitate the interaction (e.g., communication) between the client device 102 and the application node hosted by the application server 107. In the illustrated embodiment, the communication channel 106 may facilitate file streaming to upload and/or download content, and, as illustrated, communication may be supported using hypertext transfer protocol (HTTP) or hypertext transfer protocol secure (HTTPS).

Further, the application server 107 hosting the application 304 may interact with and/or within a platform 104, such as the Glide Platform 306 illustrated in FIG. 3. Through this interaction, data, such as content requested or received from the user, may respectively be retrieved from or stored in a database 108, such as the illustrated Glide Database 308, which may be included in or accessible via the Glide Platform 306.

To monitor the content moving into and out of the database 108 (e.g., Glide database 308), the platform 104 (e.g., Glide Platform 306) may also communicate with a security server 310 (here denoted as a ServiceNow Antivirus Program (SNAP) Server). As will be described in further detail below, the security server 310 may provide a service that may scan the content included in the platform 104 (e.g., in the database 108) for malicious data. Accordingly, functions involved with scanning the content may be hosted externally to the application 304 and/or the Glide platform 306.

While the application 304 is illustrated separately from the Glide Platform 306, in some embodiments, the application node hosting the application may be included in the same platform 104 as the Glide Platform 306 and/or as the Glide Database 308. That is, the dataflow diagram 300 is intended to be illustrative, and not limited to the embodiments disclosed.

Figure 4:
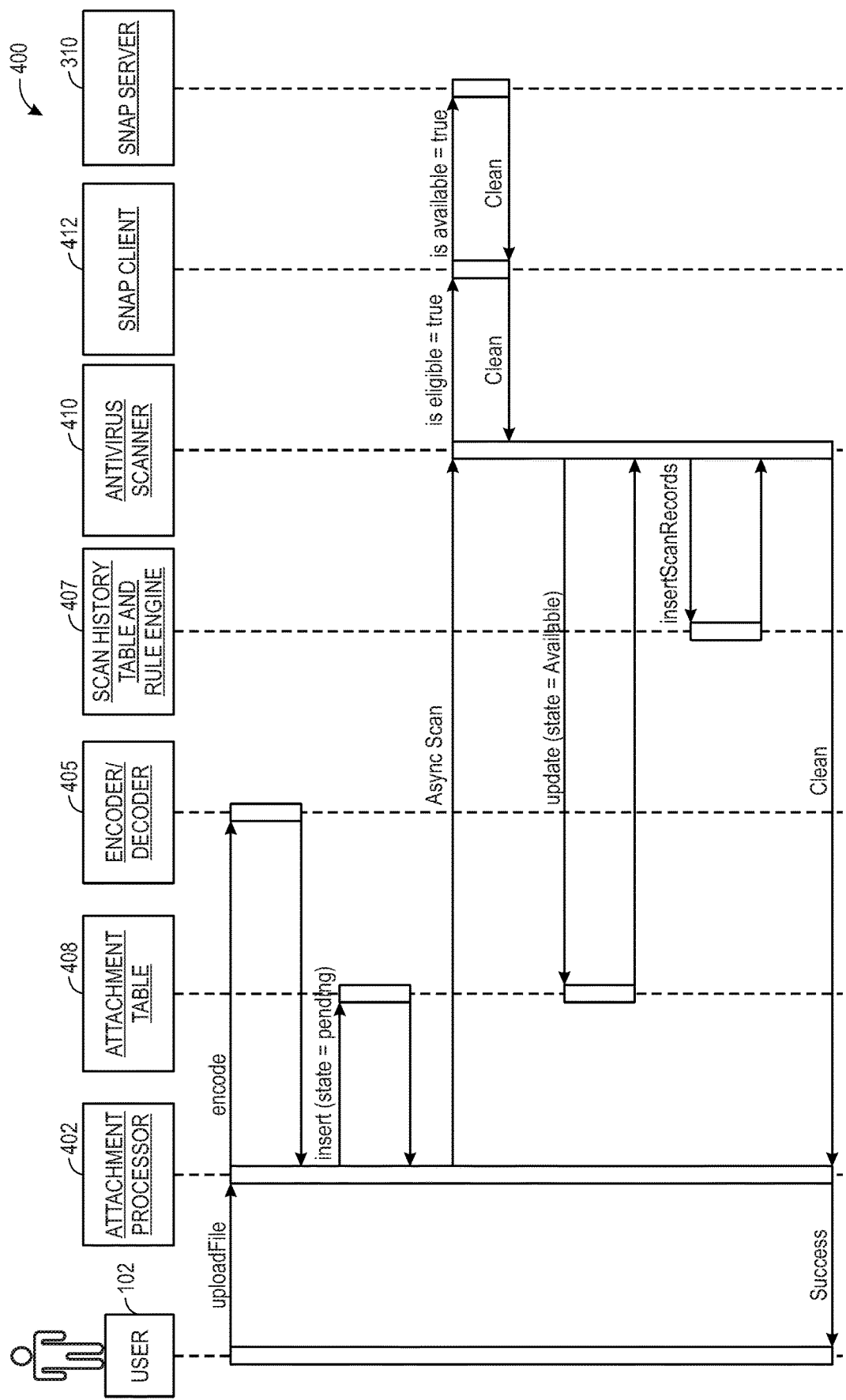
FIG. 4 is a dataflow diagram of scanning clean content uploads in an application for malicious data, in accordance with an embodiment.

Turning to FIG. 4, a second dataflow diagram 400 provides a more detailed depiction of the processes involved with uploading clean content (e.g., content that lacks malicious data) to the application. While the second dataflow diagram 400 is described in the context of a particular embodiment, it should be noted that the processes included in the second dataflow diagram 400 may be performed in any suitable order. Further, certain processes may be skipped altogether, and additional processes may be included in the second dataflow diagram 400.

A user, via a client device 102, may upload content (e.g., a file) to the application. To do so, the client device 102 may interact with a client application that, as described with reference to FIG. 3, may communicate with an application node hosted by an application server 107. In some embodiments, the client application may interface with an attachment processor 402, which may represent an application program or a portion of an application program running in the application node. The attachment processor 402 may receive the content uploaded (e.g., uploadFile) by the client device 102 and may transmit the content to an encoder/decoder 405 (e.g., encode). The encoder/decoder 405 may represent an application program or a portion of an application program (e.g., a function) running in the same application node as the attachment processor 402. Further, the encoder/decoder 405 may encode the content according to base64 encoding and/or any suitable encoding scheme for the attachment table 408. Additionally or in the alternative, the attachment processor 402 may encode the content according to base64 and/or a suitable encoding scheme for the attachment table 408. In any case, the attachment processor 402 may insert the encoded content into an attachment table 408 (e.g., insert), which may reside in a database 108, such as the Glide Database 308. Further, the attachment processor 402 and/or the database 108 may flag (e.g., mark) the inserted content to indicate that it has not been scanned for malicious data. In some embodiments, the flagged content may not be accessible to other clients 102 interacting with the platform 104. Accordingly, the flagged content may be inactive until the flag is removed, and as such, malicious data, if present in the content, may not be accessed and/or spread throughout the system 100. In the illustrated embodiment, to flag the content, the attachment processor 402 may insert the encoded content with the state pending (e.g., insert (state=pending)) and/or may update the state of the encoded content to pending after inserting it in the attachment table 408.

The attachment processor 402 may further transmit the uploaded content and/or information related to the uploaded content to an antivirus scanner 410 (e.g., Async scan) to request an asynchronous scan for malicious data in the content. The antivirus scanner 410 may be a plug-in or a portion of a plug-in available in the platform 104 and/or on the application server 107. Accordingly, before transmitting the uploaded content to the antivirus scanner 410, the attachment processor 402 may determine whether the antivirus scanner 410 is active (e.g., enabled) in the platform 104. In some embodiments, if the plug-in is enabled, the attachment processor 402 may send a message to the antivirus scanner 410 so that the antivirus scanner 410 may interact with a security client 412 (depicted here as a SNAP client), which may be another portion of the plug-in. In such embodiments, the antivirus scanner 410 may determine, based on the interaction with the security client 412, whether the content is eligible (e.g., suitable) to be scanned by the security server (e.g., isEligible==true). Eligible content may include content with a certain format, file size, and/or the like. If the content is eligible, the antivirus scanner 410 may then determine whether the security server 310 and its antivirus scanning service are available to scan the uploaded content. As such, the security client 412 may determine whether the security server 310 is powered on, able to communicate with the security client 412, and/or the like.

If the security server 310 is available (e.g., isAvailable==true), the security client 412 may transmit the uploaded content to be scanned for malicious data and/or may transmit a request to the security server 310 to scan the uploaded content. The security server 310 may then process, using a service, the uploaded content to search for malicious content. More specifically, in some embodiments, the security server 310 may contain a number of malicious data definitions (e.g., descriptors of viruses, trojans, worms, and the like) or non-signature base heuristics to compare the uploaded content against. If, as illustrated in FIG. 4, no portion of the uploaded content contains data matching a malicious data definition, the security server 310 may mark the uploaded content as clean to indicate that it does not contain malicious data. Accordingly, the security server 310 may transmit a message (e.g., a response) back to the security client 412 indicating that the uploaded content is clean. The message may further include information, such as a message identifier, a name of the file and/or content scanned, a content type of the file, and/or the like, related to the security server 310, the scan for malicious data, the file, or a combination thereof. Further, as the message may be an asynchronous response, the message may be transmitted to the security client 412 in real-time. Accordingly, the security client 412 and subsequently, the application 304 may perform other tasks while the security server 310 scans content for malicious data. The security client 412 may relay this message to the antivirus scanner 410, which may relay the message to the attachment processor 402.

In such cases, because the uploaded content is clean, the flag may be removed from the uploaded content in the attachment table 408. That is, the uploaded content may be made accessible to other clients 102 and/or components of the system 100. Accordingly, the antivirus scanner 410 and/or the attachment processor 402 may remove the flag on the uploaded content in the attachment table 408. As illustrated, to do so, the antivirus scanner 410 may update the state of the uploaded content in the attachment table from pending to available (e.g., update (state=Available)). The attachment processor 402 may additionally communicate back to the client device 102 that the content was uploaded successfully (e.g., Success) to the platform 104, and the attachment processor 402 may communicate to the client device 102 the results of the scan performed by the security server 310.

Further, in some embodiments, the attachment processor 402 and/or the antivirus scanner 410 may update a history (e.g., a table and/or a table entry) of scans performed by the security server 310 based on the message transmitted from the security server 310. For example, the antivirus scanner 410 may add an entry (e.g., insertScanRecords) to a scan history table and rule engine 407, which may be stored in the database 108 and/or in a separate database, to record the results of the scan for malicious data on the uploaded content. Additionally or alternatively, the attachment processor 402 and/or the antivirus scanner 410 may update an entry in the attachment table 408 to reflect the results of the scan.

Figure 5:
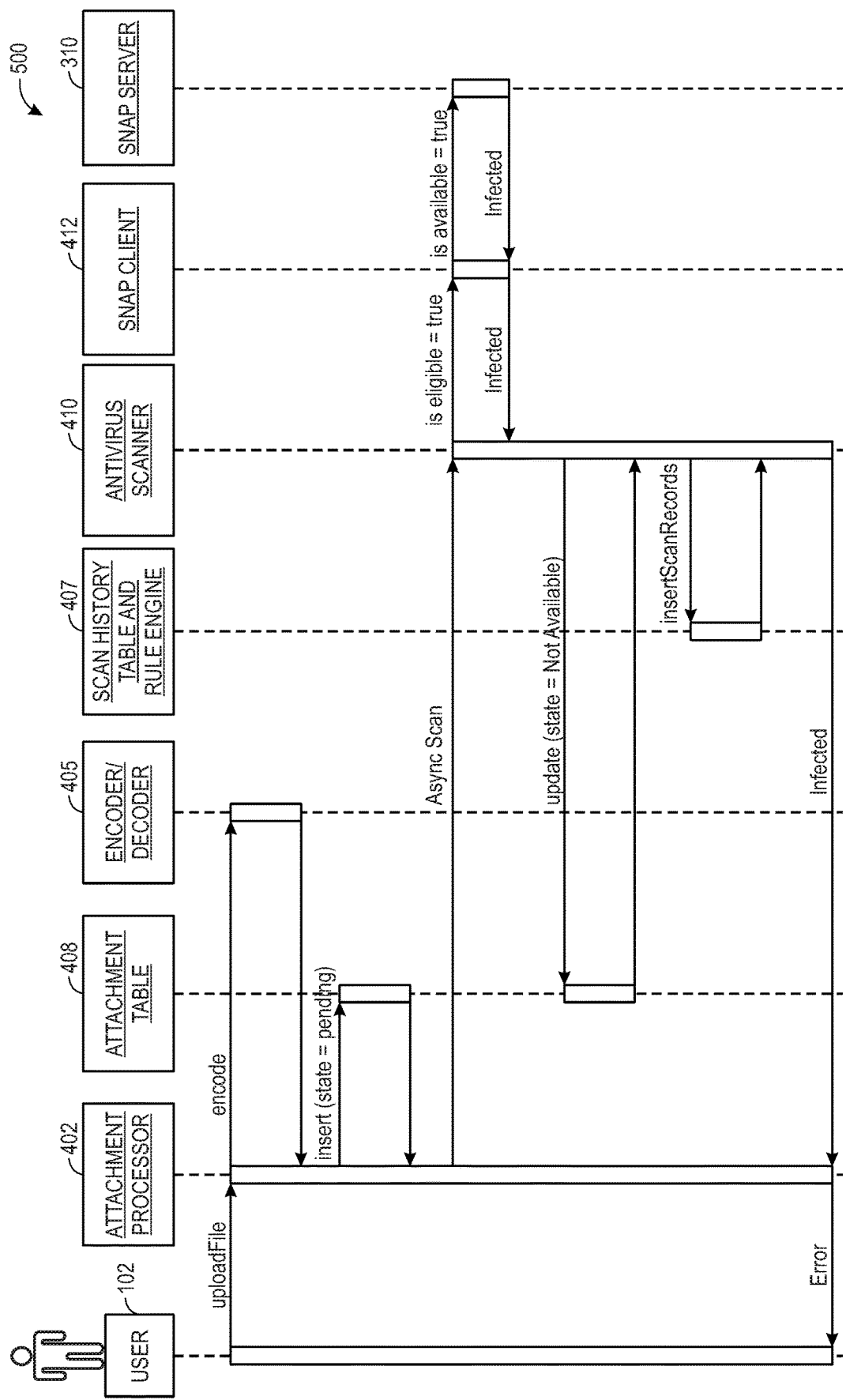
FIG. 5 is a dataflow diagram of scanning infected content uploads in an application for malicious data, in accordance with an embodiment.

If, as illustrated in the third dataflow diagram 500 of FIG. 5, any suitable portion of the uploaded content contains data matching a malicious data definition, the security server 310 may mark the uploaded content as infected to indicate that it does contain malicious data. Accordingly, the security server 310 may transmit a message (e.g., a response) back to the security client 412 indicating that the uploaded content is infected (e.g., INFECTED). The security client 412 may relay this message to the antivirus scanner 410. Upon receiving a message indicating that the uploaded content is infected, the antivirus scanner 410 may raise an event at the security client 412. The raised event may be a service level event that, for example, the security client may subscribe and/or respond to. Further, in some embodiments, the antivirus scanner 410 may quarantine the infected content that was uploaded. That is, for example, the antivirus scanner 410 may ensure that the infected content remains inaccessible so that the malicious data is not spread to additional components (e.g., clients 102, servers 126, and the like) in the system 100. Accordingly, the antivirus scanner 410 may interact with the attachment table 408 to flag the infected content in the attachments table 408 to mark it as unavailable (e.g., quarantined). As illustrated, to do so, the antivirus scanner 410 may update the state of the uploaded content in the attachment table 408 from pending to not available (e.g., update (state=Not Available)). However, in some embodiments, users with suitable privileges, such as an application administrator, may later access the stored infected content to verify and/or address (e.g., remove) the presence of malicious data in the content. Additionally or in the alternative, the antivirus scanner 410 and/or the attachment processor 402 may move the infected content from the attachment table 408 into a separate quarantine table, which may reside in the same database 108 holding the attachment table 408 or another database 108.

As discussed above with reference to the second dataflow diagram 400, the attachment processor 402 and/or the antivirus scanner 410 may also update a history (e.g., a table and/or a table entry) of scans performed by the security server 310 based on the message transmitted from the security server 310. Accordingly, the antivirus scanner 410 may add an entry (e.g., insertScanRecords) to the scan history table and rule engine 407 to record the results of the scan for malicious data on the uploaded content. Additionally or alternatively, the attachment processor 402 and/or the antivirus scanner 410 may update an entry in the attachment table 408 to reflect the results of the scan.

In any case, the antivirus scanner 410 may communicate to the attachment processor 402 that the content was infected (e.g., infected) and/or that the infected content was quarantined and/or flagged to be quarantined. Accordingly, the attachment processor 402 may send a response to the client device 102 to inform the client device 102 that the uploaded content was infected and/or that the content upload failed (e.g., error). That is, the client device 102 may be informed that the content is not available to other clients 102 and/or components in the system 100.

While the third dataflow diagram 500 is described in the context of a particular embodiment, it should be noted that the processes included in the third dataflow diagram 500 may be performed in any suitable order. Further, certain processes may be skipped altogether, and additional processes may be included in the third dataflow diagram 500.

Figure 6:
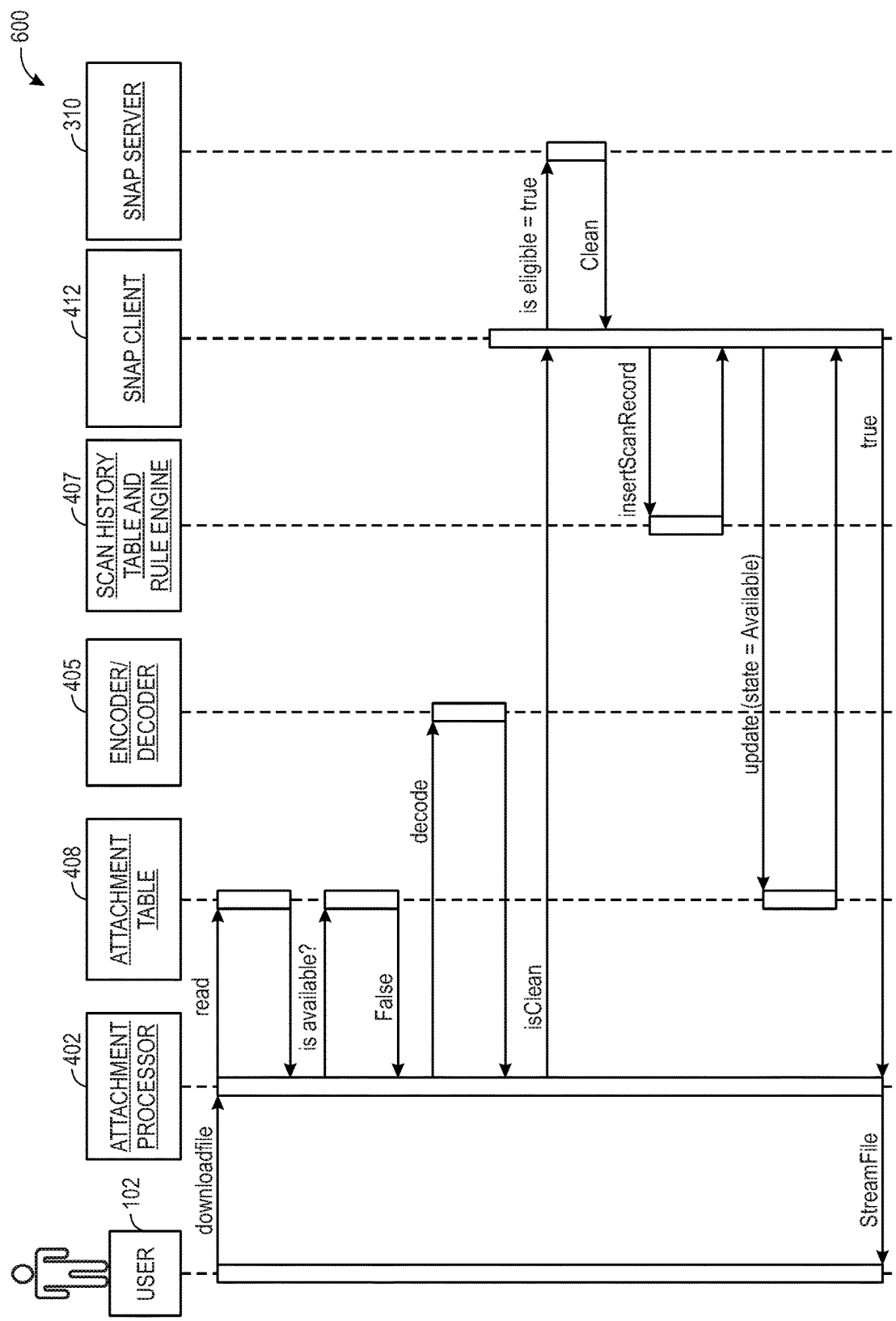
FIG. 6 is a dataflow diagram of scanning clean content requested for download from an application for malicious data, in accordance with an embodiment.

Turning now to FIG. 6, a fourth dataflow diagram 600 illustrates the processes that may be involved in downloading content from the application. While the fourth dataflow diagram 600 is described in the context of a particular embodiment, it should be noted that the processes included in the fourth dataflow diagram 600 may be performed in any suitable order. Further, certain processes may be skipped altogether, and additional processes may be included in the fourth dataflow diagram 600.

To download (e.g., retrieve) content from the application, the client device 102 may interact with the client application to request content for downloading. The client application, which may be hosted on the client device 102 (e.g., on a computing device 200), may interface with the application hosted by an application server 107. As discussed above with reference to FIGS. 4-5, the attachment processor 402, which may be a portion of the application node running the application, may receive the request from the client device 102. In this case, the request (e.g., downloadFile) may include details related to the content that the client device 102 is attempting to download from the application. The attachment processor 402 may then send a read request (e.g., read) to the attachment table 408 to retrieve the content requested for downloading. Further, the attachment processor 402 may determine whether the requested content is available (e.g., isAvailable?), which may involve determining the state, such as pending, available, available conditionally, or not available, of the content in the attachment table 408. The attachment processor 402 may determine whether the requested content is available separately from or concurrently with sending the request to retrieve the content from the attachment table 408. Further, as the content stored in the attachment table 408 may be encoded (e.g., base64 encoded), the attachment processor 402 may request the encoder/decoder 405 to decode (e.g., base64 decode) the content retrieved from the attachment table 408 into a suitable (e.g., human readable) format.

In some embodiments, based on the state of the requested content, the attachment processor 402 may determine whether the requested content will be scanned for malicious data prior to delivering the content to the user. For example, if the state of the requested content is available, the attachment processor 402 may deliver the content to the user without scanning the content for malicious data, while the attachment processor 402 may request a scan for malicious data when the state of the requested content is pending or conditionally available. Additionally or in the alternative, the attachment processor 402 may communicate with the security client 412 and/or the antivirus scanner 410 to determine whether the retrieved content will be scanned for malicious data prior to delivering the content to the user. The retrieved content may be scanned prior to its delivery to the user if, for example, the content predates the use of the malicious data scan service provided by the security server 310 in the system 100. Further, if the content predates any changes (e.g., additions, deletions, edits, and/or the like) to the malicious data definitions included in the security server 310, the retrieved content may be scanned and/or re-scanned for malicious data prior to its delivery to the user. Accordingly, the antivirus scanner 410 and/or the security client 412 may determine a date the retrieved content was uploaded to the attachment table 408 to determine whether to scan the retrieved content for malicious data. If the retrieved content will not be scanned for malicious data, as determined by the antivirus scanner 410, the antivirus scanner 410 may send a response to the attachment processor 402 communicating that the retrieved content is ready for the user to download. In response, the attachment processor 402 may transmit the retrieved content to the user by, for example, file streaming the data (e.g., StreamFile).

If, however, the antivirus scanner 410 and/or the security client 412 determines that the retrieved content will be scanned for malicious data and/or in embodiments where the retrieved content is always scanned for malicious data, the security client 412 may proceed to communicate with the security server 310. As described above with reference to FIGS. 4 and 5, the security server 310, if available (e.g., isAvailable=true), may scan the retrieved content for malicious data and the security client 412 may communicate the results of the scan. If, as illustrated in FIG. 6, the results of the scan are clean (e.g., no malicious data was identified), the security client 412 may update, in the scan history table and rule engine 407, the history of malicious data scans performed by the security server 310, as described above. Further, in some embodiments, the security client 412 may instruct the attachment table 408 to update the state of the requested content to available (e.g., update (state=available)). The security client 412 may also instruct to the attachment processor 402 to transmit the retrieved content to the user (e.g., StreamFile).

As discussed above, in some embodiments, the retrieved content may be scanned before delivery to the user regardless of the date the content was uploaded to the attachment table 408 and/or regardless of any updates to the types (e.g., definitions) of malicious data the security sever 310 scans for. As such, the security server 310, if available, may always scan suitable retrieved content before the content is delivered to the user.

Figure 7:
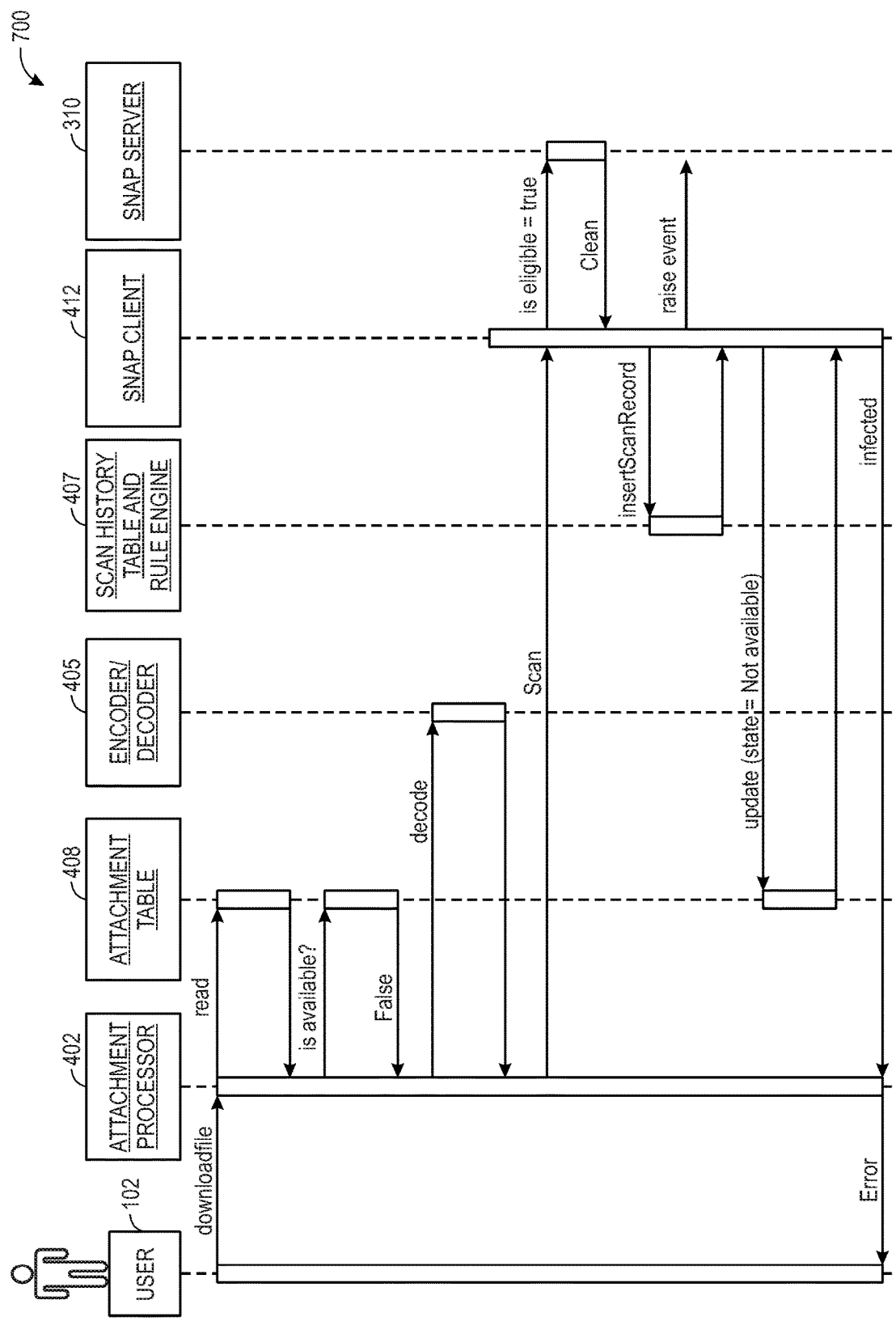
FIG. 7 is a dataflow diagram of scanning infected content requested for download from an application for malicious data, in accordance with an embodiment.

If the security server 310 detects malicious data in the retrieved content during a scan, the security server 310 may transmit a message (e.g., a response) to the security client 412 indicating that the content the user requested for download is infected (e.g., INFECTED), as illustrated in the fifth dataflow diagram 700 in FIG. 7. The security client 412 and/or the antivirus scanner 410 may then raise an event, as described above. The security client 412 may also update (e.g., insertScanRecord), in the scan history table and rule engine 407, the history of malicious data scans performed by the security server 310. Further, the security client 412 may quarantine (e.g., move and/or flag) the infected content that was requested for download. Accordingly, the security client 412 update the state of the requested content (e.g., update (state=not available)) in the attachment table 408 to mark the requested content unavailable. Further, the security client 412 may communicate to the attachment processor 402 that the infected content was quarantined and/or flagged to be quarantined. Accordingly, the attachment processor 402 may send a response to the client device 102 to inform the client device 102 that the requested content was infected and/or that the content download failed (e.g., Error).

While the processes included in FIGS. 4-7 are described as being performed by specific components (e.g., attachment processor 402, encoder/decoder 405, scan history table and rule engine 407, attachment table 408, antivirus scanner 410, security client 412, security server 310, and/or the like), any suitable process may be performed by any suitable component or combination of components. Further, the components may be hosted by any suitable element (e.g., client device 102, platform 104, application server 107, database 108, security server 310, server 126, and/or the like) within the system 100.

Figure 8:
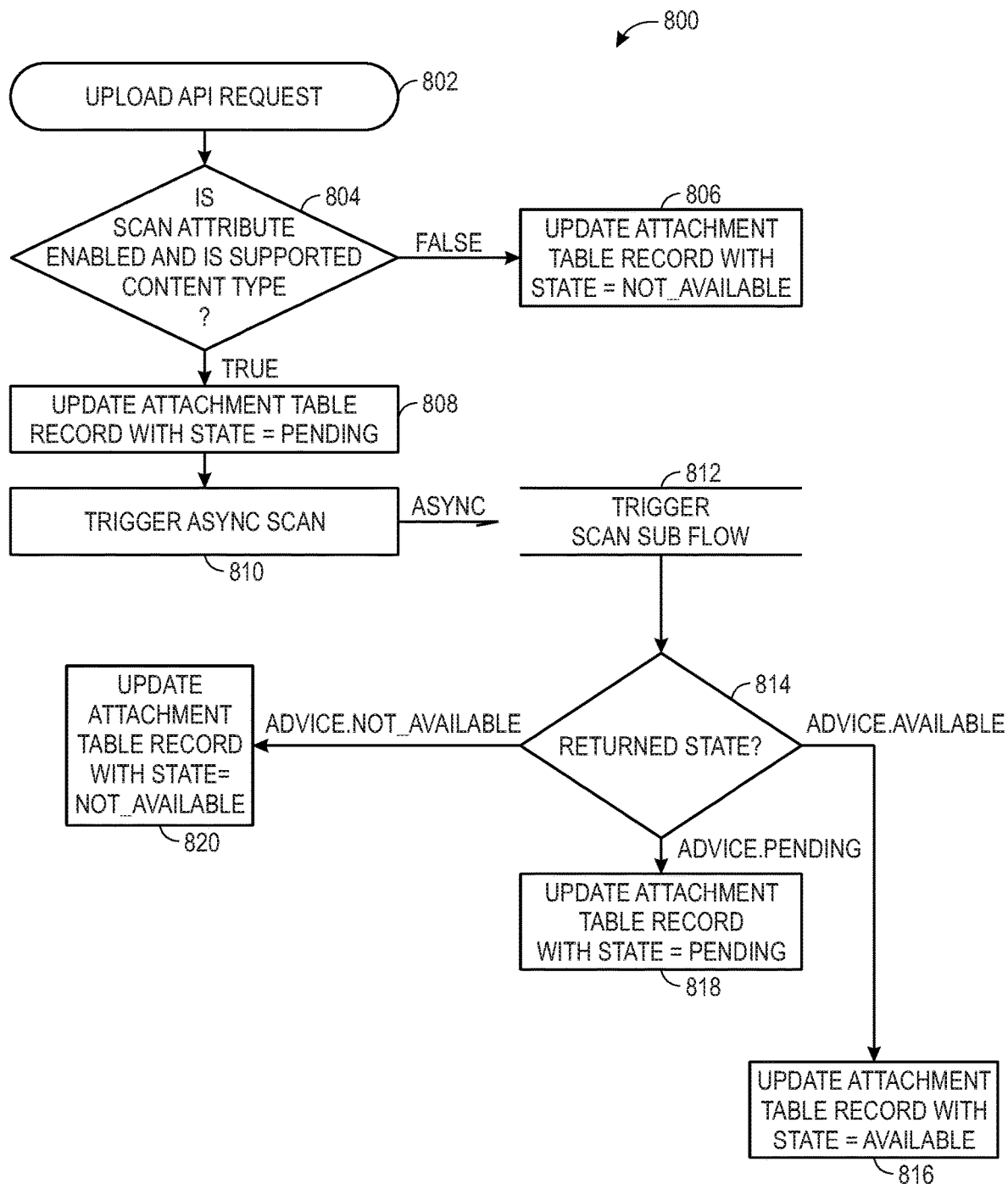
FIG. 8 is a flow diagram of a method to upload content to an application, in accordance with an embodiment.

Turning now to FIG. 8, a method 800 provides a general depiction of the steps involved with uploading content to the application. While the method 800 is described in the context of a particular embodiment, it should be noted that the steps included in the method 800 may be performed in any suitable order. Further, certain steps may be skipped altogether, and additional processes may be included in the method 800. Additionally, while the following is described as being performed by certain components within or hosted within the system 100, each step may be performed by any suitable component or combination of components, which may be hosted by any suitable element or combination of elements within the system 100.

In some embodiments, a client device 102 may initiate the method 800 by uploading an attachment (e.g., a file) to an application (process block 802). As described above, this step may involve the attachment processor 402 receiving a request (e.g., upload application programming interface (API) request) from the client device 102 to upload a file. Then, the attachment processor 402 may determine whether the antivirus scanner 410 and/or the security server 310 (e.g., scan attribute) is activated and/or enabled (decision block 804). Further the attachment processor 402 and/or the antivirus scanner 410 may determine whether the file the client device 102 requested for upload is a supported content type (decision block 804). To determine whether the antivirus scanner 410 and/or the security server 310 are enabled, the attachment processor 402 may attempt to communicate with the antivirus scanner 410. In some embodiments, if the antivirus scanner 410 is activated, the communication received by the antivirus scanner 410 from the attachment processor 402 may prompt the antivirus scanner 410 to determine whether the file the client device 102 requested for upload is eligible for scanning (e.g., a supported content type). In any case, to determine whether the file is a supported content type, the antivirus scanner 410 may determine whether the file is a suitable size (e.g., less than 25 Megabytes (MB)) and/or whether the file is a suitable format.

If the attachment processor 402 determines that the antivirus scanner 410 is not enabled, the antivirus scanner 410 determines that the attachment is not a suitable size, the antivirus scanner 410 determines that the attachment is not a suitable file format, or the security client 412 determines that the security server 310 is unavailable, the antivirus scanner 410 may update the state of the file, which may be inserted in the attachment table 408, to not available (process block 806). In such cases, the security server 310 may not perform a scan for malicious data in the uploaded content. Yet, in some embodiments, even though the content was not scanned for malicious data, a response may still be returned to the client device 102. In such cases, the response may originate from the portion of the system 100 (e.g., the attachment processor 402, the antivirus scanner 410, the security client 412 and/or the like) responsible for determining that a scan may be ignored (e.g., at decision block 804). For example, if the attachment processor 402 determines that the antivirus scanner 410 is unavailable (decision block 804), the attachment processor 402 may transmit a response to the client device 102 conveying that the antivirus scanner 410 is unavailable. Further, if the antivirus scanner 410 determines that the attachment requested for uploading is an unsuitable size (e.g., too large), the antivirus scanner 410 may transmit a response to the client device 102 to inform the client device 102 that the upload may not be completed successfully due to the size of the attachment. In any case, after a response is returned to the client device 102, the method 800 may conclude.

If, on the other hand, the file is eligible for scanning, the attachment processor 402 may update the state of the file, which may be inserted in the attachment table 408, to pending (process block 808). Further, the attachment processor 402 may trigger (e.g., request) an asynchronous (async) scan for malicious data in the uploaded content (process block 810).

Figure 9:
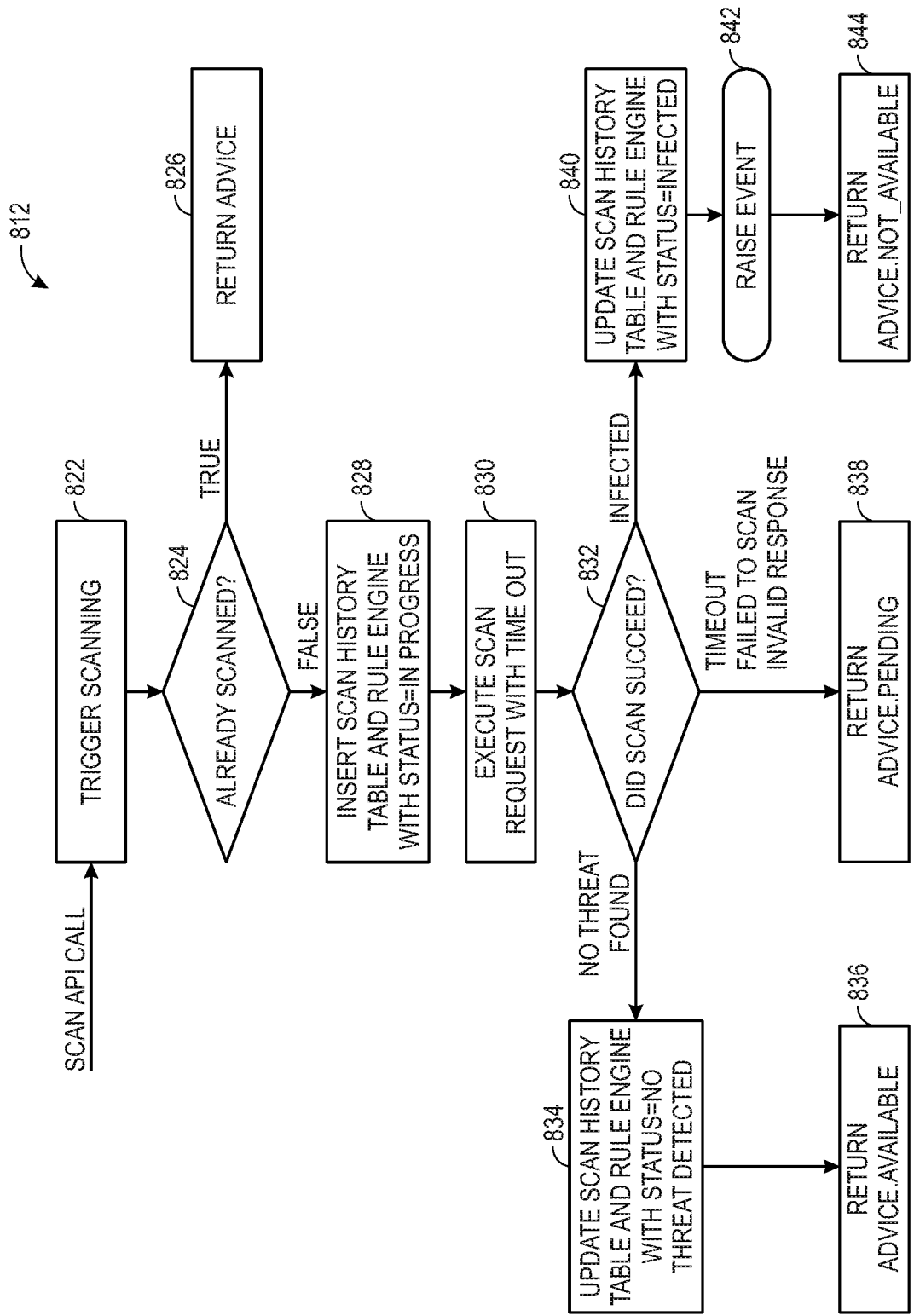
FIG. 9 is a flow diagram of a method to scan content uploaded to and/or requested for download from an application for malicious data, in accordance with an embodiment.

Turning now to FIG. 9, a method 812 provides a general depiction of the steps involved with scanning content for malicious data. While the method 812 is described in the context of a particular embodiment, it should be noted that the steps included in the method 812 may be performed in any suitable order. Further, certain steps may be skipped altogether, and additional processes may be included in the method 812. Additionally, while the following is described as being performed by certain components within or hosted within the system 100, each step may be performed by any suitable component or combination of components, which may be hosted by any suitable element or combination of elements within the system 100.

In response to receiving the attachment processor 408 triggering the asynchronous scan for malicious data (process block 810) and/or receiving an API call to scan for malicious data (e.g., scan API call), the method 812 may be initiated (process block 822). Accordingly, in some embodiments, the antivirus scanner 410 may then transmit instructions to the security client 412 to determine whether the security server 310 is available to perform the scanning service on the file. Further, the method 812 may involve determining whether the content has already been scanned for malicious data (decision block 824). Determining whether the content has already been scanned may involve the antivirus scanner 410, the security client 412, and/or the like determining whether the scan history table and rule engine 407 includes a scan record corresponding to the content. If the content has already been scanned for malicious data, advice (e.g., a response), which may correspond to the state of the content resulting from the previous scan may be returned to, for example, the attachment processor (process block 826). If, on the other hand, the content has not been scanned for malicious data or the state (e.g., pending) of the previous scan indicates that the content will be re-scanned, a new scan record corresponding to the content may be inserted into the scan history table and rule engine 407 (process block 828). In some embodiments, a status of this scan record may be set to in progress to indicate that the scan for malicious data is pending.

In some embodiments, if the security server 310 is available to perform a scan for malicious data, the security server 310 may then scan the file (e.g., attachment) to identify malicious data, if present, in the file (process block 830). The security server 310 may perform this scan for malicious data within a certain duration, and after this duration elapses, the scan operation may time out, which may result in an error or a warning, as described below. After the security server 310 has attempted to scan the file, the security server 310 may determine whether the scan was successful (decision block 832). If, for example, no malicious data and/or threat was discovered during the scan, the scan record corresponding to the content in the scan history table and rule engine 407 may be updated with a status of no threat detected (process block 834). Further, advice (e.g., a response) indicating that the content is clean and/or available may be returned (process block 836). That is, for example, the results of the scan may be returned in a response, which may be relayed to the client device 102. However, if the scan of the content failed to scan, timed out after the duration elapsed, and/or provided an invalid response, advice indicating that the content scan was unsuccessful and/or that the content's state is pending and/or conditionally available may be returned (process block 838).

On the other hand, if malicious data and/or a threat was discovered during the scan, the scan record corresponding to the content in the scan history table and rule engine 407 may be updated with a status of infected (process block 840). An event corresponding (e.g., service level event) to the identification of infected content may also be raised (process block 842). Further, advice (e.g., a response) indicating that the content is infected and/or not available may be returned (process block 844).

While the method 812 is described above as being initiated by the attachment processor 408 triggering the asynchronous scan, which may result from content upload to and/or requested for download from the application, in some embodiments, the method 812 may additionally or alternatively run periodically (e.g., once every 5 minutes, hour, day, or week) in order to scan for malicious data in the content included in the attachment table 408. Further, the method 812 may be initiated in response to an input from the client device 102 that is unrelated to a request to upload and/or download an attachment. For example, an administrator in the system 100 (e.g., a user with suitable privileges) may request the method 812 to scan for malicious data in the content included in the attachment table 408. Additionally or alternatively, in response to a new definition of malicious data in the security server 310, the method 812 may be initiated to scan the content included in the attachment table 408 according to the most recent definitions of malicious data included in the security server 310. In any of these cases, the method 812 may be run on particular content or a set of content included in the attachment table 408. As such, the method 812 may be iterated over for content related to each file in the attachment table 408, and/or the method 812 may be used to simultaneously scan content related to a group of files in the attachment table 408.

Returning now to FIG. 8, after the method 812 has concluded, which may involve advice (e.g., a response) being returned (e.g., at process block 826, process block 836, process block 838, or process block 844), the state returned in the advice may be determined (decision block 814). In some embodiments, for example, the security client 412 may receive the response from the security server 310 and may then relay these results to the antivirus scanner 410. The antivirus scanner 410 may additionally or alternatively transmit the results to the attachment processor 402.

In any case, if the state of the advice is available, the state of content, which may be stored in the attachment table 408, may be updated to available (process block 816). Accordingly, the content may be available to additional client devices 102 and/or other components in the system 100. Additionally or in the alternative, the attachment processor 402 may indicate to the client device 102 that the attachment was uploaded successfully. Further, if the state of the advice is determined to be pending, the state of the content in the attachment table 408 may be updated to pending. In such cases, the attachment may be re-scanned by the security server 310 before it is made available to additional client devices 102 and/or components in the system 100. Further, if the state of the advice is determined to be not available, the state of the content in the attachment table 408 may be updated to not available (process block 820). With a state of not available, the content may be unavailable to additional client devices 102 and/or components of the system 100. In such cases, the attachment processor 402 may indicate to the client device 102 that the attachment was not uploaded successfully and/or that there was an error with the upload.

Figure 10:
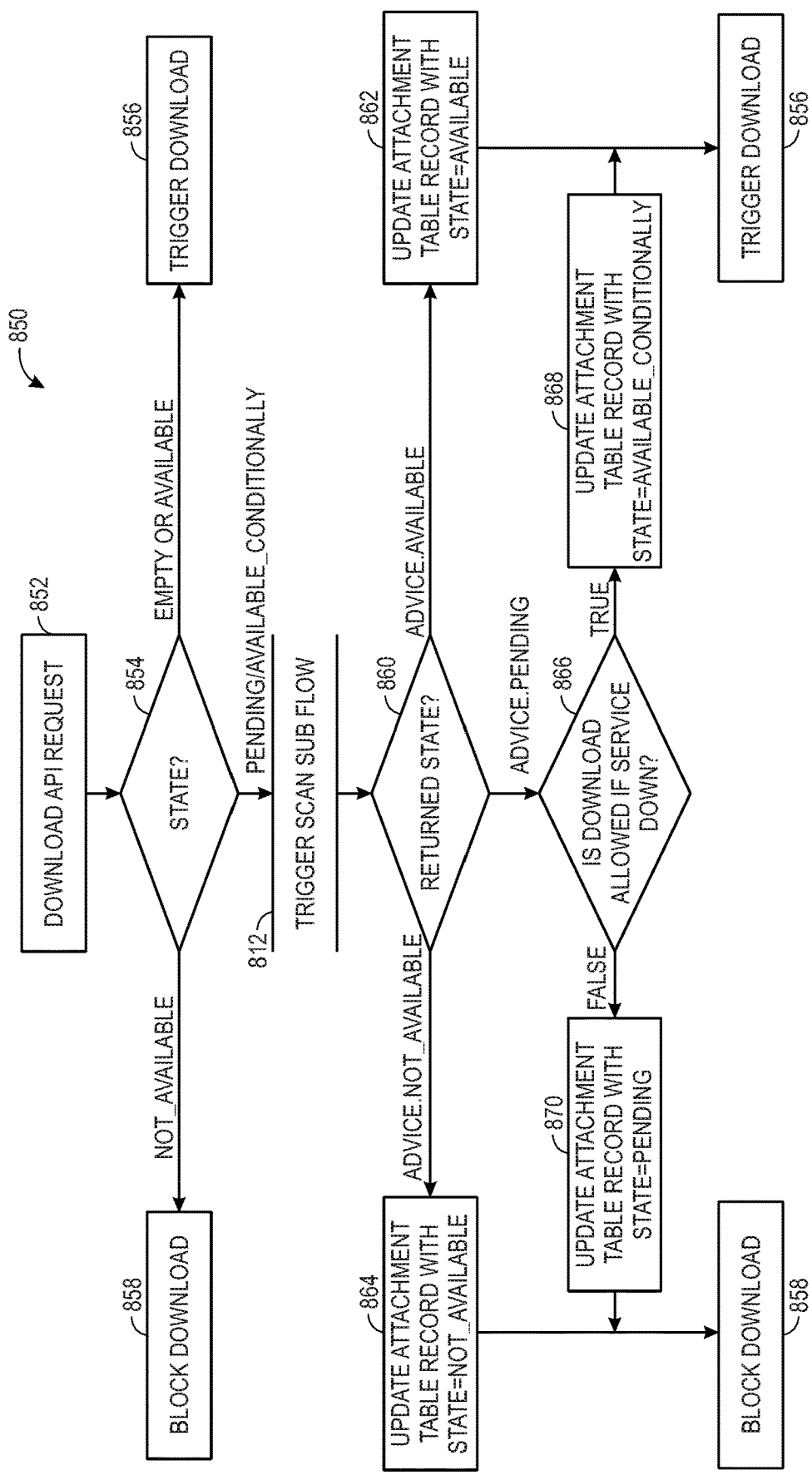
FIG. 10 is a flow diagram of a method to download content from an application, in accordance with an embodiment.

Turning now to FIG. 10, a method 850 provides a general depiction of the steps involved with downloading content from the application. While the method 850 is described in the context of a particular embodiment, it should be noted that the steps included in the method 850 may be performed in any suitable order. Further, certain steps may be skipped altogether, and additional processes may be included in the method 850. Additionally, while the following is described as being performed by certain components within or hosted within the system 100, each step may be performed by any suitable component or combination of components, which may be hosted by any suitable element or combination of elements within the system 100.

In some embodiments, the method 850 may be initiated by a request (e.g., download API request) to download an attachment (e.g., a file) from the application (process block 852). As described above, this step may involve the attachment processor 402 receiving a request from the client device 102 to download a file. Then, the attachment processor 402, for example may determine the state of the file (e.g., content) (process block 854), which may be stored in the attachment table 408. If the state of the content is available or the content has no state (e.g., empty), the content may be downloaded (process block 856). That is, for example, because the content has been previously scanned and marked as available, the content may be downloaded to a client device 102 without re-scanning the content for malicious data. If, however, the state of the content is not available, the download request may be blocked (e.g., ignored) (process block 858). In some embodiments, for example, because the content was previously scanned and was identified as infected with malicious data, the download request may be blocked without re-scanning the content for malicious data. Further, if the state of the content is pending or available conditionally, a request may trigger an asynchronous scan for malicious data in content requested for download (process block 812).

As described above with reference to FIG. 9, this scan for malicious data may follow method 812 and may return advice (e.g., at process block 826, process block 836, process block 836, process block 838, or process block 844). Accordingly, the method 850 may then involve determining the state returned in this advice (decision block 860). If the state of the advice is determined to be available, the state of the content in the attachment table 408 may be updated to available (process block 862). Further, the download of the content at, for example, a client device 102 may be triggered (process block 856). Accordingly, the content may, be downloaded onto the client device 102 via, for example, a file stream. If, however, the state of the advice is determined to be not available, the state of the content in the attachment table 408 may be updated to not available (process block 864). Further, downloads of the content from the attachment table 408 may be blocked (process block 858). Accordingly, the client device 102 may be prevented from downloading the content.

If, on the other hand, the state of the advice is determined to be pending, the method 850 may involve determining whether the content may be downloaded if the security server 310 is unavailable, the scan was interrupted (e.g., timeout), the content failed to scan, the scan produced an invalid response, and/or the like (decision block 866). Whether the content may be downloaded under such conditions may be based in part on one or more attributes (e.g., file format, file size, and/or the like) of the content, one or more settings in the system 100, and/or the like.

If, under such conditions, the content may be downloaded, the state of the content in the attachment table 408 may be updated to available conditionally (process block 868) and the downloading process of of the content may be triggered (856). Accordingly, in such cases, the content may be re-scanned for malicious data upon an additional request to download the content (process block 852). However, if, under such conditions, the content may not be downloaded, the state of the content in the attachment table 408 may be updated to pending (process block 870) and downloads of the content from the attachment table 408 may be blocked (process block 858). Again, in such cases, the content may be re-scanned for malicious data upon an additional request to download the content (process block 852).

Figure 11:
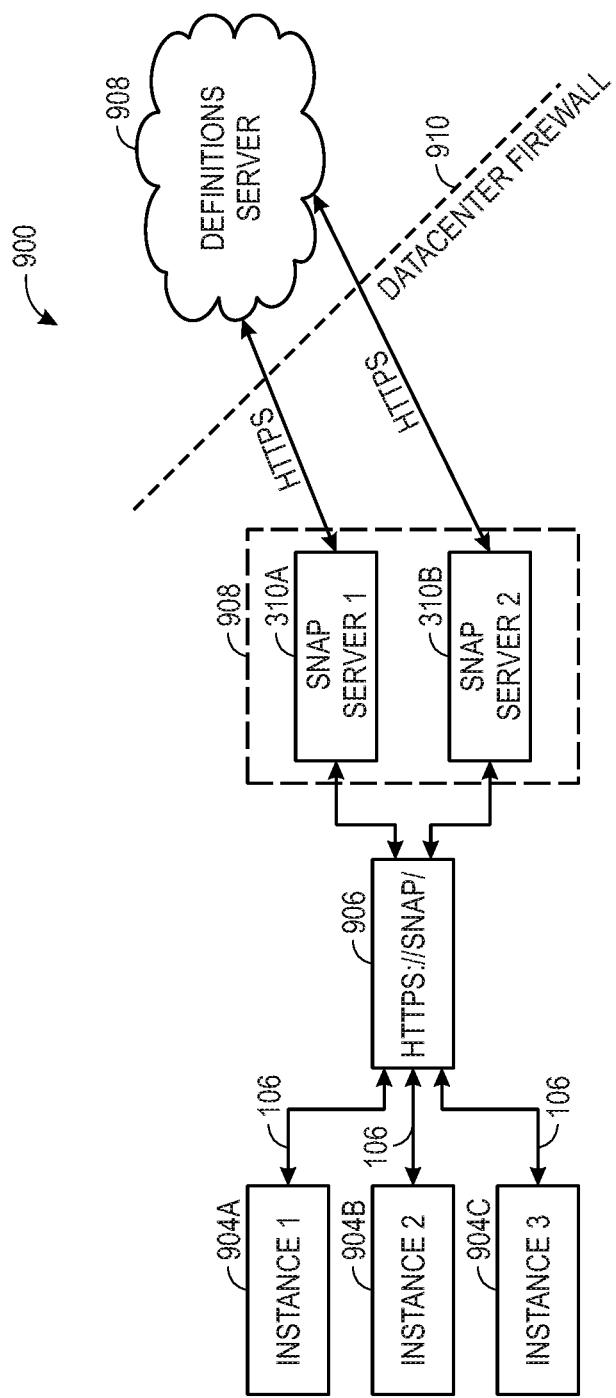
FIG. 11 is a block diagram of a distributed computing system utilizing a load balancer and a datacenter, in accordance with an embodiment.

As described above, the security server 310 may scan for malicious data based on one or more definitions of malicious data. Accordingly, FIG. 11 is a block diagram of second system 900 in which the security server 310 may communicate with a definitions server 902 in order to obtain and/or update these definitions of malicious data. The second system 900 may be included within and/or in communication with the system 100. Further, the second system 900 may include application nodes 904 (e.g., 904A, 904B, and 904C) that are hosted by an application server 107 and that each run an application program. In some embodiments, for example, these application nodes 904 may host any combination of the attachment processor 402, the attachment table 408, the encoder/decoder 408, the scan history table and rule engine 407, the antivirus scanner 410, and the security client 412 described in FIGS. 4-7. Further, these application nodes 904 may communicate with the security server 310 via, for example, their security client 412.

In some embodiments, the second system 900 may include a load balancer 906, such as an HTTPS load balancer, that may route communications, such as requests, from an application node 904 to a suitable security server 310 in a datacenter 908. For example, the load balancer 906 may receive a first request from a first application node 904A to scan first content for malicious data and may route the first request to a first security server 310A. If the load balancer 906 receives a second request from a second application node 904B to scan second content for malicious data while the first security server 310A is handling the first request, the load balancer 906 may route the second request to a second security server 310B in order to distribute the processing load between the first security server 310A and the second security server 310B. As a result, the second request may be handled more efficiently (e.g., more rapidly) than if the second request was routed to the first security server 310A to be handled after the first request.

In some embodiments, to communicate with a security server 310, the application nodes 904 and/or the security client 412 may send a request to the load balancer 906 via a communication channel (e.g., communication channel 106). While the illustrated request may be sent over the communication channel with scripted representational state transfer (REST) application programming interfaces (APIs) (e.g., REST on https), any suitable communication protocol and/or format may be utilized.

As illustrated, the security servers (e.g., the first security server 310A and the second security server 310B) may reside in a datacenter 908. While the illustrated datacenter 908 includes the first security server 310A and the second security server 310B, embodiments may include any suitable number of security servers 310 within a datacenter 908. Further, while a single datacenter 908 is illustrated in the second system 900, the second system 900 may include any suitable number of datacenters 908. These datacenters 908 may be distributed in geographically distinct locations. As such a first datacenter 908 may more efficiently service a first location, while a second datacenter 908 may more efficiently service a second location that is different from the first location.

Further, in order to obtain malicious data definitions the security servers 310 may communicate with a definitions server 902, such as a vendor server and/or a different server. As the datacenter 908 and/or the security servers 310 may include a firewall, such as datacenter firewall 910, the communications sent between the security servers 310 and the definitions server 902 may adhere to a suitable security protocol. For example, the communications sent between the security servers 310 and the definitions server 902 may utilize a specific channel and/or port number and/or may be authenticated prior to their submission and/or receipt.

In any case, with communication established between the security servers 310 and the definitions server 902, the security servers 310 may obtain definitions of malicious data that may include criteria to identify viruses, worms, malware, and/or the like. Accordingly, in some embodiments, a security server 310 may retrieve definitions of malicious data from the definitions server 902 during a scan of content for malicious data to ensure the content is scanned against the most recent definitions of malicious data. Additionally or alternatively, the security server 310 may retrieve definitions of malicious data from the definitions server 902 and may store the retrieved definitions of malicious data locally (e.g., in a database 108 associated with the security server 310). In such cases, when the security server 310 communicates with the definitions server 902, the definitions server 902 may return new and/or updated definitions of malicious data compared to the definitions stored locally. As such, an initial upload of malicious data definitions to the security server 310 may utilize a certain amount of time and memory space, while subsequent updates to the locally stored malicious data definitions may utilize significantly less time and memory space, as fewer data changes may be made. Additionally or alternatively, the security server 310 may replace all of its locally stored definitions with the definitions in the definitions server 902. Further, in some embodiments, the definitions of malicious data may be retrieved with a certain periodicity (e.g., once an hour, once every six hours, once a day, once a week, or the like) so as to reduce the frequency with which the security server 310 communicates with the definitions server 902. Such embodiments may reduce processing time and resources involved in servicing a request received from an application node 904.

By hosting the security servers 310 at the load balanced datacenter 908 level, the time and resources involved with performing the malicious data scan may be centralized at the malicious data scan service. As a result, the rest of the system 100 may be more available in terms of time and resources. That is, for example, instead of running a blocking, time-consuming process to scan content for malicious data at each application node 904, which may limit the performance of the application program, the security server 310 may handle the malicious data scan and may return an asynchronous response to the application node 904 at the completion of the malicious data scan. Accordingly while the security server 310 handles the malicious data scan, the application node 904 may process other tasks. Further, hosting the malicious data scan as a service in the security servers 310 may provide scalable (e.g., elastic) throughput. That is, because the second system 900 may include multiple security servers 310 across a suitable number of datacenters 908 associated with one or more load balancers 906, an increased number of requests received from application nodes 904 may be handled by redistributing requests to one or more suitable security servers 310 via the one or more load balancers 906 and/or by bringing additional security servers 310 online as needed. As such, a number of requests from application nodes 904 may be handled in the second system 900 with and/or without adding resources (e.g., hardware) to the second system 900. Additionally, as the one or more datacenters 908 in the second system 900 may be geographically distributed, the malicious data scan service may be optimized for differences in geographic locations. For example, an application request received from a first application node 904A via a client device 102 in a first location may be handled more rapidly by a security server 310 in a datacenter 908 in a first location than by a security server 310 in a datacenter 908 in a second location.

Figure 12:
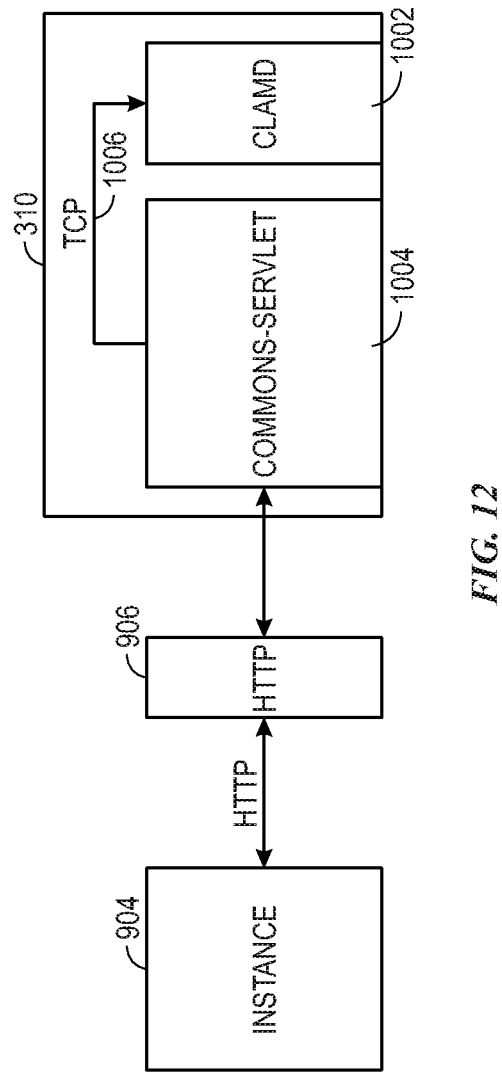
FIG. 12 is a block diagram of a server in the datacenter of FIG. 11 configured to scan content for malicious data, in accordance with an embodiment.

While the security server 310 may implement malicious data scanning and/or receive the definitions of malicious data from any number of antivirus providers (e.g., third party and/or custom implementations) and/or vendors, FIG. 12 illustrates a block diagram of the security server 310 configured to implement antivirus scanning functionality, such as the clamD scanning function 1002 of CLAMAV® by CISCO SYSTEMS, INC. In some embodiments, the security server 310 may include a commons-servlet based component 1004 which may communicate with an application node 904 using, for example, REST API. Accordingly, the commons-servlet based component 1004 may receive a request from an application node 904 to scan content for malicious data after the load balancer 906 has routed the request to the security server 310. The commons-servlet based component 1004 may additionally communicate with the antivirus scanning function 1002 using, for example, a localhost transport communication protocol port. Accordingly, the commons-servlet based component 1004 may transmit content to the antivirus scanning function 1002 so that the antivirus scanning function 1002 may scan the content for malicious data.

The antivirus scanning function 1002 may serve as a daemon function (e.g., background function) that may be stored in memory 206 of the security server 310. Accordingly, the antivirus scanning function 1002 may scan data (e.g., content and/or files) automatically. As such, the antivirus scanning function 1002 may scan content upon receiving it from the commons-servlet based component 1004. Further, to accommodate the antivirus scanning function 1002 the security server 310 may locally store (e.g., in memory 206) the malicious data definitions that the antivirus scanning function 1002 may utilize to perform scans of the content. Thus, to update the malicious data definitions, the security server 310 may regularly (e.g., periodically) run a freshclam function (not shown) or its equivalent in order to communicate with a CLAMAV® server (e.g., a definitions server 902) that may contain malicious data definitions and to retrieve updated and/or new malicious data definitions.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system, comprising:
a plurality of security servers; and
an application server that is in communication with the plurality of security servers, wherein the application server is configured to host an application program, and wherein the application server is configured to:
  receive a request, from a client computing device remote from the application server, to upload content to the application program; and
  in response to receiving the request:
    receive an upload of the content from the client computing device to the application program;
    set a table field controlling availability of the content to an initial state that prevents distribution of the content to additional client computing devices remote from the application server; and
    transmit an additional request to a load balancer, wherein the load balancer directs the additional request to a respective security server of the plurality of security servers based on one or more load balancing criteria;
  wherein in response to receiving the additional request, the respective security server is configured to:
    analyze the content to identify malicious data in the content; and
    in response to a result of analyzing the content to identify malicious data, transmit a response to the application server, wherein the response causes the application server to update the table field to an updated state that determines availability of the content to the additional client computing devices remote from the application server.

2. The system of claim 1, wherein the one or more load balancing criteria comprise resource availability of the plurality of security servers.

3. The system of claim 1, wherein the one or more load balancing criteria comprise a geographic location of each security server of the plurality of security servers.

4. The system of claim 1, wherein the response comprises one of a status of available or unavailable, each corresponding to a different entry to the table field, wherein the table field is accessed in subsequent requests for the content to determine whether the content is distributable to the additional client computing devices remote from the application server.

5. The system of claim 1, wherein the response comprises an asynchronous response.

6. The system of claim 1, wherein the malicious data comprises one or more of a virus, a worm, a trojan, or malware.

7. The system of claim 1, wherein the plurality of security servers are configured to identify the malicious data in the content based at least in part on a definition of malicious data.

8. The system of claim 7, wherein the plurality of security servers are configured to retrieve the definition of malicious data from a definitions server in the system.

9. The system of claim 7, wherein the definition of malicious data is stored in the plurality of security servers, wherein the plurality of security servers are configured to:
with a certain periodicity, retrieve an updated definition of malicious data from a definitions server; and
update the definition of the malicious data based at least in part on the updated definition of malicious data.

10. A method to identify malicious data in a digital file, comprising:
receiving, at an application server, a request from a client computing device remote from the application server to upload the digital file to an application program, wherein the application server is configured to host the application program;
determining whether a service configured to identify malicious data in the digital file is available, wherein a plurality of security servers remote from the application server are configured to host the service;
in response to determining the service is available;
setting a table field controlling availability of the digital file to an initial state that prevents distribution of the digital file to additional client computing devices remote from the application server; and
transmitting an additional request to a load balancer, wherein the load balancer directs the additional request to a respective security server of the plurality of security servers based on one or more load balancing criteria, wherein the additional request comprises instructions configured to cause the security sever to run the service on the digital file; and
receiving, at the application server, a response from the security server, wherein the response is based at least in part on a result of running the service, wherein the response causes the application server to update the table field to an updated state that determines availability of the digital file to the additional client computing devices remote from the application server.

11. The method of claim 10, wherein the one or more load balancing criteria comprise resource availability of the plurality of security servers.

12. The method of claim 10, comprising:
determining that the service is configured to identify the malicious data in the digital file when the digital file is of a respective format.

13. The method of claim 10, wherein the response comprises an asynchronous response.

14. The method of claim 10, wherein a format of the digital file comprises one or more of an image format, a document format, or a media format.

15. A system, comprising:
a plurality of security servers; and
an application server, wherein the application server device is configured to run an application node and configured to transmit a request to a load balancer in communication with the plurality of security servers to scan content received from an external client device for malicious data, wherein the load balancer directs the request to a respective security server of the plurality of security servers based on one or more load balancing criteria; and
wherein the respective security server is configured to receive the request and in response to receiving the request, the respective security server is configured to:
identify the malicious data in the content based at least in part on a definition of malicious data; and
transmit a response to the application server, wherein the response is based at least in part on the identification of the malicious data and wherein the response causes the application server to update a table field with a table that determines availability of the content to additional client computing devices remote from the application server.

16. The system of claim 15, wherein the application server is configured to transmit the request in response to receiving a client request to upload the content via the application node.

17. The system of claim 15, wherein the application server is configured to transmit the request via a plug-in associated with the application node.

18. The system of claim 15, wherein the definition of malicious data is retrieved from a definitions server.

19. The system of claim 15, wherein the security server is on a first side of a firewall and is configured to retrieve the definition of malicious data from a definitions server, wherein the definitions server is on a second side of the firewall, wherein the second side of the firewall is different from the first side of the firewall.

* * * * *